United States Patent
Ise

(12)
(10) Patent No.: US 6,409,849 B1
(45) Date of Patent: Jun. 25, 2002

(54) METHOD OF PRODUCING HYDROGEN-ABSORBING ALLOY FOR NICKEL-HYDROGEN ALKALINE STORAGE CELL

(75) Inventor: Tadashi Ise, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/650,754

(22) Filed: Aug. 30, 2000

(30) Foreign Application Priority Data

Aug. 31, 1999 (JP) .......................................... P11-244451

(51) Int. Cl.⁷ .............................. B22F 1/00; B22F 1/02
(52) U.S. Cl. ..................................................... 148/513
(58) Field of Search ............................. 75/332; 148/513

(56) References Cited

U.S. PATENT DOCUMENTS

| | | | |
|---|---|---|---|
| 5,879,429 A | 3/1999 | Yamamura et al. | 75/332 |
| 6,165,643 A * | 12/2000 | Doyle et al. | 429/218.2 |
| 6,255,018 B1 * | 7/2001 | Ise et al. | 429/218.2 |

FOREIGN PATENT DOCUMENTS

| | | |
|---|---|---|
| JP | 7-326353 | 12/1995 |
| JP | 9-283130 | 10/1997 |

* cited by examiner

*Primary Examiner*—Daniel J. Jenkins
(74) *Attorney, Agent, or Firm*—Armstrong, Westerman & Hattori, LLP

(57) ABSTRACT

The invention provides a method of producing hydrogen-absorbing alloy that can remarkably improve a high-rate discharge characteristic of a nickel-hydrogen alkaline storage cell at low temperature. This is achieved by a method of producing hydrogen-absorbing alloy for use in a nickel-hydrogen alkaline storage cell including the following steps of (a) immersing a hydrogen-absorbing alloy in an alkali treatment solution having a temperature of 60° C. or higher to subject a surface of the hydrogen-absorbing alloy to an alkali treatment; (b) after the step (a), adding a pH-adjusting agent and a reducing agent to the alkali treatment solution to treat the surface of the hydrogen-absorbing alloy using the alkali treatment solution; and (c) washing the hydrogen-absorbing alloy treated by the step (b).

17 Claims, No Drawings

METHOD OF PRODUCING HYDROGEN-ABSORBING ALLOY FOR NICKEL-HYDROGEN ALKALINE STORAGE CELL

BACKGROUND OF THE INVENTION (1) Field of the Invention

The present invention relates to a method of producing hydrogen-absorbing alloy for use in negative electrodes of nickel-hydrogen alkaline storage cells.

(2) Description of the Prior Art

Hydrogen-absorbing alloy is capable of reversibly absorbing and desorbing hydrogen and is therefore employed for the negative electrode material in nickel-hydrogen alkaline storage cells. Nickel-hydrogen alkaline storage cells employing hydrogen-absorbing alloy have many advantages over conventional storage cells such as lead storage cells and nickel-cadmium storage cells, the advantages including greater energy density. For this reason, it is believed that nickel-hydrogen alkaline storage cells will account for a large proportion of next generation alkaline storage cells.

Nickel-hydrogen alkaline storage cells, however, have a drawback that the high-rate discharge characteristic at low temperature is insufficient. In order to improve the high-rate discharge characteristic, there has been suggested a technique of subjecting hydrogen-absorbing alloy to a heat-alkali treatment. In addition, in order to further improve this technique, Japanese Unexamined Patent Publication No. 9-283130 suggests a method in which a reducing agent is added to the alkali treatment solution, and Japanese Unexamined Patent Publication No. 7-326353 suggests a method in which metal ions are added to the alkali treatment solution.

SUMMARY OF THE INVENTION

The foregoing improved methods, however, do not take the pH of the alkali treatment solution into account. Therefore, the advantageous effects of adding a reducing agent or metal ions are not fully utilized. As a consequence, the foregoing methods have not yet sufficiently improved the high-rate discharge characteristic at low temperature.

In view of the foregoing and other problems in prior art, it is an object of the present invention to provide a method of producing a hydrogen-absorbing alloy that is capable of remarkably improving low-temperature high-rate discharge characteristics of nickel-hydrogen alkaline storage cells by sufficiently utilizing the effects of adding a reducing agent and/or metal ions.

This and other objects are accomplished in accordance with the present invention by providing a method of producing a hydrogen-absorbing alloy for use in a nickel-hydrogen alkaline storage cell, comprising the steps of: (a) immersing a hydrogen-absorbing alloy in an alkali treatment solution having a temperature of 60° C. or higher to subject a surface of the hydrogen-absorbing alloy to an alkali treatment; (b) after the step (a), adding a pH-adjusting agent and a reducing agent to the alkali treatment solution to treat the surface of the hydrogen-absorbing alloy using the alkali treatment solution; and (c) washing the hydrogen-absorbing alloy treated by the step (b).

According to the above-described method, in the step (a), metal oxide or the like on the surface of the alloy is dissolved in the solution. In the step (b), the surface of the alloy is reduced, and also, metal ions dissolved in the solution in the step (a) are formed in the state of metal and deposited on the surface of the alloy. In the step (c), the solution is removed from the surface of the alloy. Thereby, it is made possible to produce a hydrogen-absorbing alloy excellent in electrochemical activity and electrical conductivity. It is noted here that in the step (b), a pH-adjusting agent in addition to a reducing agent is added to the alkali treatment solution in order to deposit metal on the surface of the alloy. This results in a high efficiency in reduction since the reduction is performed at an appropriate pH value. Accordingly, the surface of the alloy is sufficiently reduced, while metal ions dissolved out from the surface of the hydrogen-absorbing alloy into the solution in the step (a) are formed in the state of metal and sufficiently deposited on the surface of the hydrogen-absorbing alloy. Therefore, electrical conductivity of the surface of the hydrogen-absorbing alloy is improved while electrical resistance between the alloy particles each other is decreased. As a result, the nickel-hydrogen alkaline storage cell employing such a hydrogen-absorbing alloy achieves a remarkably improved high-rate discharge characteristic at low temperature.

In the step (b) of the above-described method, the alkali treatment solution may have a pH of 4 to 9 after the pH-adjusting agent is added.

When the pH of the alkali treatment solution is in the range of pH 4 to pH 9, metal is more efficiently deposited from the alkali treatment solution onto the surface of the alloy, and as a result, the electrical conductivity of the alloy is further improved.

In the above-described method, the alkali treatment solution may contain a complexing agent.

When the alkali treatment solution contains a complexing agent, metal ions dissolved in the solution in the step (a) become a complex compound, and therefore metal does not easily deposit as a hydroxide. As a result, more metal ions are present in the solution after the step (a), and the ions are reduced in the step (b) and deposited on the surface of the alloy. Consequently, the amount of metal on the surface of the alloy is increased and the electrical conductivity between the alloy particles each other is thereby improved. Hence, the low-temperature high-rate discharge characteristic of the cell is further improved.

In the above-described method, the alkali treatment solution may contain metal ions.

By adding metal ions to the alkali treatment solution in advance, the amount of metal deposited on the surface of the electrode in the step (b) can be further increased.

As discussed above, by sufficiently utilizing the effects of adding a reducing agent and/or metal ions, the present invention can achieve remarkable improvement in high-rate discharge characteristics of nickel-hydrogen alkaline storage cells at low temperature.

DESCRIPTION OF THE PREFERRED EMBODIMENTS

EXAMPLE 1

Preparation of Negative Electrode

First, commercially available misch metal (abbreviated as Mm: a mixture of rare earth elements such as La, Ce, Nd, Pr, and the like), nickel (Ni), cobalt (Co), aluminum (Al), and manganese (Mn) were selected as materials, and these materials were mixed at an element ratio of 1:3.6:0.6:0.3:0.5, respectively. Thereafter, the mixture was melted at 1500° C. with the use of a high frequency induction furnace, and the molten mixture was cooled on a water-cooled roll made of copper. Thus, a hydrogen-absorbing alloy represented by the composition formula $MmNi_{3.6}Co_{0.6}Al_{0.3}Mn_{0.5}$ was prepared. Next, by pulverizing the hydrogen-absorbing alloy thus prepared, hydrogen-absorbing alloy powder having an average particle diameter of 60 μm was obtained.

Thereafter, the hydrogen-absorbing alloy powder was added to a solution in which LiOH was dissolved at a rate of 30 g/L in a KOH solution having a specific gravity of 1.30, and then, the solution with the hydrogen-absorbing alloy powder was heated at 90° C. Thus, a surface treatment of the hydrogen-absorbing alloy powder was performed. Next, a pH-adjusting agent composed of hydrochloric acid was added to the above-mentioned KOH solution having LiOH dissolved therein, and the pH of the solution was adjusted to pH 5. Subsequently, to the solution to which the pH-adjusting agent was added, a reducing agent composed of sodium hypophosphite was added at a rate of 1 M/L (mol/liter) to perform a reduction treatment. Thereafter, the hydrogen-absorbing alloy powder was sufficiently washed with water.

Subsequently, 99 parts by weight of the hydrogen-absorbing alloy powder was mixed with water and 1 part by weight of PEO (polyethylene oxide) to prepare a slurry. The slurry was applied onto a punched metal, and the punched metal with the slurry was dried and flat-rolled. Thus, a hydrogen-absorbing alloy electrode was prepared.

Preparation of Positive Electrode

First, 100 parts by weight of nickel hydroxide, 7 parts by weight of metallic cobalt as an electronic conductor, 5 parts by weight of cobalt hydroxide, and 20 parts by weight of an aqueous solution containing 1 wt. % methylcellulose as a binder, were mixed and kneaded to prepare a slurry. Thereafter, the prepared slurry was impregnated into a porous substrate composed of a foam metal, and the substrate with the slurry was dried and press-formed. Thus, a non-sintered nickel positive electrode was prepared.

Preparation of Cell

The foregoing hydrogen-absorbing alloy negative electrode and the non-sintered nickel positive electrode were wound with a separator interposed therebetween to form a power-generating assembly. The power-generating assembly was then enclosed in a cell can, and the cell can was filled with an electrolytic solution composed of 30 wt. % aqueous solution of potassium hydroxide. Then, the cell can was hermetically sealed. Thus, a cylindrical-shaped nickel-hydrogen alkaline storage cell was produced. The theoretical capacity of the cell thus produced was 1000 mAh.

It is to be noted here that the reducing agent usable herein is not limited to sodium hypophosphite mentioned above. Other examples usable for the reducing agent include potassium hypophosphite, sodium boron hydride, potassium boron hydride, and hydrazine.

In addition, the pH-adjusting agent is not particularly limited to the hydrochloric acid mentioned above and various materials may be employed, insofar as they can maintain the pH of the alkali treatment solution in the range of from pH 4 to pH 9. Other examples usable as the pH-adjusting agent include nitric acid, sulfuric acid, and acetic acid. Further, when an alkali such as potassium hydroxide, lithium hydroxide, or a salt thereof was added to the solution in addition to the pH-adjusting agent, more precise control of the pH of the solution can be realized.

Further, the alkali treatment solution may further contain a complexing agent composed of, for example, citric acid, gluconic acid, pyrophosphoric acid, EDTA (ethylenediaminetetraacetic acid), or a salt thereof. The alkali treatment solution can further contain metal ions of, for example, cobalt, nickel, copper, bismuth, gold, silver, or the like.

In addition, the temperature of the alkali treatment solution is not restricted to 90° C. mentioned above. When the temperature of the alkali treatment solution is 60° C. or higher, substantially the same effects as above can be obtained.

Hydrogen-absorbing alloys usable for the present invention are not limited to the alloy described above, and various hydrogen-absorbing alloys may be employed insofar as the alloys contain cobalt, nickel, or the like.

A hydrogen-absorbing alloy having a $CaCu_5$ type crystal structure is particularly preferable for the negative electrode active material of nickel-hydrogen alkaline storage cells, and an example of such a hydrogen-absorbing alloy having a $CaCu_5$ type crystal structure can be represented by the general formula $MmNi_aCo_bAl_cMn_d$, where $a>0$, $b>0$, $c>0$, $d \geq 0$ and $4.4 \leq a+b+c+d \leq 5.4$. In the general formula, Mm is a mixture of the rare-earth elements selected from the group consisting of La, Ce, Pr, Nd, Sm, Eu, Sc, Y, Pm, Gd, Tb, Gy, Ho, Er, Tm, Yb, and Lu. Particularly preferable is Mm mainly composed of a mixture of La, Ce, Pr, Nd, and Sm.

The hydrogen-absorbing alloys having the above-described compositions can fully satisfy the basic performances required for alkaline secondary cells such as desired cycle characteristics and discharge characteristics. Further, at least one material selected from the group of Si, C, W, B, Cu, Zr, and Fe can be added to the above-described hydrogen-absorbing alloys insofar as the amount of these additives is within a range such that the hydrogen-absorbing characteristics of the alloy are not altered.

In addition, it is preferable that in the foregoing general formula, the amount of nickel "a" be $2.8 \leq a \leq 5.2$, the amount of cobalt "b" be $0 < b \leq 0.4$, the amount of aluminum "c" be $0 < c \leq 1.2$, and the amount of manganese "d" be $d \leq 1.2$. Further, in order to increase the cell capacity, it is preferable that the amount of aluminum "c" be $c \leq 1.0$, and the amount of manganese "d" be $d \leq 1.0$.

In addition, the core material for the hydrogen-absorbing alloy electrode is not limited to the above-described punched metal, but other materials including foamed nickel and sintered nickel fibers may be employed.

EXAMPLES 2 to 4

Cells of Examples 2 to 4 according to the present invention were produced in the same manner as in Example 1 above except that in each of Examples 2–4, cobalt hydroxide, nickel hydroxide, or copper hydroxide was respectively added to the alkali treatment solution at a rate of 5 wt. %.

The cells thus produced are hereinafter referred to as, respectively, cells A2, A3, and A4 of the present invention.

EXAMPLE 5

A cell of Example 5 was produced in the same manner as in Example 1 above except that gluconic acid was added as a complexing agent to the alkali treatment solution at a rate of 10 ml/L (milliliter/liter).

The cell thus produced is hereinafter referred to as a cell A5 of the present invention.

EXAMPLE 6

A cell of Example 6 was produced in the same manner as in Example 1 above except that cobalt hydroxide was added to the alkali treatment solution at 5 wt. % and gluconic acid was also added as a complexing agent to the alkali treatment solution at a rate of 10 ml/L (milliliter/liter).

The cell thus produced is hereinafter referred to as a cell A6 of the present invention.

Comparative Example 1

A cell was produced in the same manner as in Example 1 above except that neither hydrochloric acid as a pH-adjusting agent nor sodium hypophosphite as a reducing agent was added to the alkali treatment solution.

The cell thus produced is hereinafter referred to as a comparative cell X1.

Comparative Example 2

A cell was produced in the same manner as in Example 1 above except that hydrochloric acid as a pH-adjusting agent was not added to the alkali treatment solution.

The cell thus produced is hereinafter referred to as a comparative cell X2.

Comparative Example 3

A cell was produced in the same manner as in Example 1 above except that hydrochloric acid as a pH-adjusting agent was not added to the alkali treatment solution while cobalt hydroxide was added.

The cell thus produced is hereinafter referred to as a comparative cell X3.

Experiment 1

Using the foregoing cells A1 to A6 of the present invention and the comparative cells X1 to X3, a low-temperature discharge characteristic of each cell was examined under the following conditions. Each of the cells was first activated by subjecting the cell to charging and discharging 3 cycles under the following charge-discharge condition (1) at room temperature. Thereafter, the cell was charged and discharged under the charge-discharge condition (2) set forth below. The results are shown in Table 1 below.

Charge-discharge Conditions (1) Charge: The subjected cell was charged at 100 mA for 16 hours, and then rested for 1 hour.
  Discharge: The subjected cell was discharged at 200 mA until the end-of-discharge voltage became 1 V, and then rested for 1 hour.
(2) Charge: The subjected cell was charged at 100 mA for 16 hours (room temperature), and then rested for 1 hour (−10° C.).
  Discharge: The subjected cell was discharged at 1000 mA until the end-of-discharge voltage became 1 V (−10° C.).

The low-temperature discharge characteristic herein is a discharge capacity at −10° C. expressed as a percentage of a discharge capacity at the room temperature.

TABLE 1

| Cell | pH-adjusting agent (Adjusted pH) | Reducing agent | Additive(s) to the alkali treatment solution | Low-temperature discharge characteristic (%) |
|---|---|---|---|---|
| A1 | Hydrochloric acid (5) | Sodium hypophosphite | — | 85 |
| A2 | Hydrochloric acid (5) | Sodium hypophosphite | Cobalt hydroxide | 89 |
| A3 | Hydrochloric acid (5) | Sodium hypophosphite | Nickel hydroxide | 87 |
| A4 | Hydrochloric acid (5) | Sodium hypophosphite | Copper hydroxide | 87 |
| A5 | Hydrochloric acid (5) | Sodium hypophosphite | Gluconic acid | 87 |
| A6 | Hydrochloric acid (5) | Sodium hypophosphite | Cobalt hydroxide + Gluconic acid | 91 |
| X1 | — | — | — | 65 |
| X2 | — | Sodium hypophosphite | — | 70 |
| X3 | — | Sodium hypophosphite | Cobalt hydroxide | 72 |

As apparent from Table 1 above, the cells A1 to A6 according to the present invention exhibited remarkably improved low-temperature discharge characteristics in comparison with those of the comparative cells X1 to X3. The reason is as follows. In the comparative cell X1, neither pH-adjusting agents nor additives were used. Although the comparative cell X2 employs a reducing agent and the comparative cell X3 employs a reducing agent and an additive, neither of them employs a pH-adjusting agent. Accordingly, in these comparative cells X2 and X3, when the reducing agent is added, the solution has a high concentration of alkali. When an acidic reducing agent such as sodium hypophosphite is added to the alkali treatment solution, the solution is neutralized and therefore the reducing power is decreased. It is considered that for this reason, metallic cobalt did not deposit on the surface of the electrode sufficiently.

By contrast, in the cells A1 to A6 of the present invention, a pH-adjusting agent was added to the solution. Therefore, an efficient reduction treatment was performed at an appropriate pH. As a result, metal such as metallic cobalt sufficiently deposited on the surface of the alloy. Consequently, the low-temperature discharge characteristic was remarkably improved.

It is also seen from Table 1 above that the cells A2 to A6 according to the present invention achieved higher low-temperature discharge characteristics than the cell A1 of the present invention. This is considered to be due to the following reason. In the cells A2 to A4 of the present invention, metal hydroxide such as cobalt hydroxide is added to the alkali treatment solution, and the metal hydroxide exist in the alkali treatment solution in the form of metal ions. Since the reducing agent is present in the alkali treatment solution, metal in the metal hydroxide deposit on the surface of the electrode. This results in a further increase of the amount of metal on the electrode surface. In addition, regarding the cell A5 of the present invention, a complexing agent is added to the alkali treatment solution. Therefore, metal ions in the alkali treatment solution are made into a complex compound, thus not easily depositing in the form of hydroxide. Accordingly, the metal exists in the alkali treatment solution in the form of metal ions, and as a result, the effect of the treatment increases, which leads to a further increase of the amount of metal on the surface of the electrode. Furthermore, in the cell A6 of the present invention, both the reducing agent and metal hydroxide are present, which further increases the effect as described above.

By contrast, in the cell A1, neither the reducing agent nor metal hydroxide was employed. Therefore, the cell A1 was not able to exhibit the effect as described above.

Experiment 2

For Experiment 2, six types of cells were produced in the same manner as in Example 1 above except that the adjusted pH values were varied (pH values=3, 4, 6, 7, 9, and 10). The cells thus produced were hereinafter referred to as a cell B1 (pH=3), a cell B2 (pH=4), a cell B3 (pH=6), a cell B4 (pH=7), a cell B5 (pH=9), and a cell B6 (pH=10) respectively. Using the cells B1 to B6, each of the cells was activated by charging and discharging under the same condition as in Experiment 1 (Charge-discharge condition (1) above) and thereafter charged and discharged in the same condition as in Experiment 1 (Charge-discharge condition (2) above) to examine the low-temperature discharge characteristics. The results are shown in Table 2 below. For reference, Table 2 also shows the result of the foregoing cell A1 of the present invention.

TABLE 2

| Cell | pH-adjusting agent (Adjusted pH) | Reducing agent | Additive(s) to the alkali treatment solution | Low-temperature discharge characteristic (%) |
|---|---|---|---|---|
| B1 | Hydrochloric acid (3) | Sodium hypophosphite | — | 75 |
| B2 | Hydrochloric acid (4) | Sodium hypophosphite | — | 85 |
| A1 | Hydrochloric acid (5) | Sodium hypophosphite | — | 85 |
| B3 | Hydrochloric acid (6) | Sodium hypophosphite | — | 82 |
| B4 | Hydrochloric acid (7) | Sodium hypophosphite | — | 80 |
| B5 | Hydrochloric acid (9) | Sodium hypophosphite | — | 83 |
| B6 | Hydrochloric acid (10) | Sodium hypophosphite | — | 75 |

As apparent from Table 2 above, the cells B2 to B5 and A1 of the present invention exhibited improved low-temperature discharge characteristics in comparison with those of the cells B1 and B6 of the present invention.

This is considered to be due to the following reason. The cell B1 of the present invention has too low a pH value while the cell B6 of the present invention has too high a pH value. By contrast, the cells B2 to B5 and A1 of the present invention have appropriate pH values. From this experiment, it is understood that the preferable pH range of the alkali treatment solution to be adjusted by the pH-adjusting agent is from pH 4 to pH 9.

Although the present invention has been fully described by way of examples, it is to be noted that various changes and modification will be apparent to those skilled in the art. Therefore, unless such changes and modifications depart from the scope of the present invention, they should be construed as being included therein.

What is claimed is:

1. A method of producing a hydrogen-absorbing alloy for use in a nickel-hydrogen alkaline storage cell, comprising the steps of:

(a) immersing a hydrogen-absorbing alloy in an alkali treatment solution having a temperature of 60° C. or higher to dissolve a metal oxide out of a surface of said hydrogen-absorbing alloy;

(b) after said step (a), adding a pH-adjusting agent and a reducing agent to said alkali treatment solution to deposit a metal from metal ions in said alkali treatment solution; and (c) washing said hydrogen-absorbing alloy treated by said step (b).

2. A method according to claim 1, wherein said alkali treatment solution has a pH of 4 to 9 after said pH-adjusting agent has been added.

3. A method according to claim 1, wherein said pH-adjusting agent is an acid.

4. A method according to claim 3, wherein said acid is selected from the group consisting of hydrochloric acid, nitric acid, sulfuric acid, acetic acid, and combinations thereof.

5. A method according to claim 1, wherein said alkali treatment solution comprises a complexing agent.

6. A method according to claim 5, wherein said complexing agent is selected from the group consisting of citric acid, gluconic acid, pyrophosphoric acid, ethylenediaminetetraacetic acid, salts thereof, and combinations thereof.

7. A method according to claim 1, wherein in said step (a), said alkali treatment solution contains metal ions.

8. A method according to claim 7, wherein said metal ions are selected from the group consisting of cobalt ions, nickel ions, copper ions, bismuth ions, gold ions, silver ions, and combinations thereof.

9. A method of producing a hydrogen-absorbing alloy for use in a nickel-hydrogen alkaline storage cell, comprising the steps of:

(a) immersing a hydrogen-absorbing alloy in an alkali treatment solution having a temperature of 60° C. or higher to dissolve a metal oxide from a surface of said hydrogen-absorbing alloy;

(b) after said step (a), adding a pH-adjusting agent and an alkali and a reducing agent to said alkali treatment solution to deposit a metal from metal ions in said alkali treatment solution; and (c) washing said hydrogen-absorbing alloy treated by said step (b).

10. A method according to claim 9, wherein said alkali treatment solution has a pH of 4 to 9 after said pH-adjusting agent has been added.

11. A method according to claim 10, wherein said pH adjusting agent is an acid.

12. A method according to claim 11, wherein said acid is selected from the group consisting of hydrochloric acid, nitric acid, sulfuric acid, acetic acid, and combinations thereof.

13. A method according to claim 12, wherein said alkali is selected from the group consisting of potassium hydroxide, lithium hydroxide, and combinations thereof.

14. A method according to claim 13, wherein, in said step (a), said alkali treatment solution comprises a complexing agent.

15. A method according to claim 14, wherein said complexing agent is selected from the group consisting of citric acid, gluconic acid, pyrophosphoric acid, ethylenediaminetetraacetic acid, salts thereof, and combinations thereof.

16. A method according to claim 15, wherein said alkali treatment solution contains metal ions.

17. A method according to claim 16, wherein said metal ions are selected from the group consisting of cobalt ions, nickel ions, copper ions, bismuth ions, gold ions, silver ions, and combinations thereof.

* * * * *